US008825301B2

(12) United States Patent
Sugawara et al.

(10) Patent No.: US 8,825,301 B2
(45) Date of Patent: Sep. 2, 2014

(54) ELECTRIC POWER STEERING APPARATUS

(75) Inventors: Takayoshi Sugawara, Kanagawa (JP);
Masahiro Maeda, Gunma (JP); Yong Wei, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/055,623

(22) PCT Filed: Jan. 25, 2010

(86) PCT No.: PCT/JP2010/050871
§ 371 (c)(1),
(2), (4) Date: Feb. 25, 2011

(87) PCT Pub. No.: WO2010/087295
PCT Pub. Date: Aug. 5, 2010

(65) Prior Publication Data
US 2011/0276229 A1     Nov. 10, 2011

(30) Foreign Application Priority Data
Jan. 28, 2009   (JP) ................. 2009-016135

(51) Int. Cl.
*B62D 6/08*    (2006.01)
*B62D 5/04*    (2006.01)

(52) U.S. Cl.
CPC ............ *B62D 5/0463* (2013.01); *B62D 5/0466* (2013.01)
USPC ........................................... 701/42; 180/412

(58) Field of Classification Search
CPC ................... B62D 6/08; B62D 5/04
See application file for complete search history.

(56) References Cited

U.S. PATENT DOCUMENTS

| 5,040,629 | A | * | 8/1991 | Matsuoka et al. | 180/446 |
| 5,668,722 | A | * | 9/1997 | Kaufmann et al. | 701/41 |
| 5,704,446 | A | * | 1/1998 | Chandy et al. | 180/446 |
| 6,013,994 | A | * | 1/2000 | Endo et al. | 318/432 |
| 6,161,068 | A | * | 12/2000 | Kurishige et al. | 701/41 |
| 6,272,410 | B2 | * | 8/2001 | Okanoue et al. | 701/42 |
| 6,360,151 | B1 | * | 3/2002 | Suzuki et al. | 701/41 |
| 6,459,962 | B2 | * | 10/2002 | Ulrich et al. | 701/1 |
| 6,594,568 | B2 | * | 7/2003 | Matsuoka | 701/41 |
| 6,876,910 | B2 | * | 4/2005 | Kifuku | 701/41 |
| 7,136,732 | B2 | * | 11/2006 | Shimizu et al. | 701/41 |
| 7,239,104 | B2 | * | 7/2007 | Heilig et al. | 318/561 |

(Continued)

FOREIGN PATENT DOCUMENTS

JP          3082483 B2   8/2000
JP       2002-037109 A   2/2002

(Continued)

*Primary Examiner* — John R Olszewski
*Assistant Examiner* — Jean-Paul Cass
(74) *Attorney, Agent, or Firm* — Sughrue Mion, PLLC

(57) ABSTRACT

An electric power steering apparatus that compensates both a static friction and a dynamic friction, performs the switching between a static friction compensation and a dynamic friction compensation smoothly and without unpleasant sensation in order to achieve a natural comfortable steering feeling. In an electric power steering apparatus wherein a current command value is calculated based on at least a steering torque, and a motor is controlled by a current control value calculated based on said current command value to provide a steering assist force to a steering mechanism, wherein: there is provided a friction compensator calculating a friction compensation value for compensating friction to said steering mechanism on the basis of said steering torque, and said current command value is corrected by said friction compensation value.

13 Claims, 10 Drawing Sheets

(56) References Cited

U.S. PATENT DOCUMENTS

| | | | |
|---|---|---|---|
| 7,740,103 B2* | 6/2010 | Sasajima | 180/443 |
| 7,828,112 B2* | 11/2010 | Kezobo et al. | 180/446 |
| 8,175,771 B2* | 5/2012 | Ukai et al. | 701/41 |
| 2001/0027364 A1* | 10/2001 | Matsuoka | 701/41 |
| 2002/0026267 A1* | 2/2002 | Kifuku | 701/41 |
| 2008/0189014 A1 | 8/2008 | Tanaka et al. | |
| 2008/0236934 A1* | 10/2008 | Sasajima | 180/446 |
| 2008/0306655 A1* | 12/2008 | Ukai et al. | 701/42 |
| 2009/0294208 A1* | 12/2009 | Nishimura et al. | 180/446 |
| 2011/0276229 A1* | 11/2011 | Sugawara et al. | 701/42 |
| 2013/0245893 A1* | 9/2013 | Sprinzl | 701/42 |

FOREIGN PATENT DOCUMENTS

| | | |
|---|---|---|
| JP | 2003-170856 A | 6/2003 |
| JP | 2004-217095 A | 8/2004 |
| JP | 2005-170257 A | 6/2005 |
| JP | 2007-125973 A | 5/2007 |
| JP | 2008-230537 A | 10/2008 |
| JP | 2008230537 | * 10/2008 |

* cited by examiner

PRIOR ART

ELECTRIC POWER STEERING APPARATUS

CROSS REFERENCE TO RELATED APPLICATIONS

This application is a National Stage of International Application No. PCT/JP2010/050871 filed Jan. 25, 2010, claiming priority based on Japanese Patent Application No. 2009-016135 filed Jan. 28, 2009, the contents of all of which are incorporated herein by reference in their entirety.

TECHNICAL FIELD

The present invention relates to an electric power steering apparatus which provides a steering mechanism of a vehicle with a steering assist force by a motor, and in particular to an electric power steering apparatus which carries out a friction compensation for the steering mechanism based on a steering torque.

BACKGROUND ART

An electric power steering apparatus, that an assist steering device of a vehicle by means of a rotational torque of a motor, applies a driving force of the motor as an assist force to a steering shaft or a rack shaft by means of a transmission mechanism such as gears or a belt through a reduction mechanism. Such a conventional power steering apparatus performs a feedback control of motor current in order to generate steering assist torque (steering assist force) accurately. The feedback control adjusts the voltage supplied to the motor so that a difference between a current command value and a detected motor current value becomes small or zero, and the adjustment of the voltage applied to the motor is generally performed by the adjustment of a duty ratio of PWM (Pulse Width Modulation) control.

A general configuration of an electric power steering apparatus will be described with reference to FIG. 1. A column shaft (steering shaft) 2 coupled to a steering wheel (handle) 1 is coupled to tie rods 6 of steered wheels through reduction gears 3, universal joints 4a, 4b, and a rack-and-pinion mechanism 5. The column shaft 2 is provided with a torque sensor 10 for detecting the steering torque of the steering wheel 1, and a motor 20 for assisting the steering force of the steering wheel 1 is coupled to the column shaft 2 through the reduction gears 3. Electric power is supplied to a control unit 100 for controlling the electric power steering apparatus from a battery 14, an ignition key signal is also inputted the control unit 100 through an ignition switch 11, and the control unit 100 calculates a current command value of the steering assist command on the basis of a steering torque T detected by the torque sensor 10 and a velocity V detected by a velocity sensor 12, and controls a current to be supplied to the motor 20 on the basis of a current control value E which is calculated by performing compensation and so on to the current command value.

The control unit 100 mainly comprises a CPU (or an MPU or an MCU), and general functions performed by a program within the CPU are shown in FIG. 2.

The functions and operations of the control unit 100 will be described with reference to FIG. 2. The steering torque T detected by the torque sensor 10 and the velocity V from the velocity sensor 12 are inputted to a current command value calculating section 101, and a current command value Iref1 is calculated based on the steering torque T and the velocity V in the current command value calculating section 101. The steering torque T, a motor angular speed $\omega$ and a motor angular acceleration $\omega^*$ are inputted to a torque compensator 110, and a torque compensation value Cm is calculated. The current command value Iref1 calculated by the current command value calculating section 101 is phase-compensated by a phase compensator 102 to increase the stability of the steering system. A current command value Iref2 phase-compensated by the phase compensator 102 and the torque compensation value Cm are inputted to an adder 103, and an added result of the adder 103 is outputted as a current command value Iref3. The current command value Iref3 is inputted to a maximum current limiter 104, the maximum current limiter 104 limits the maximum of the current and outputs a limited current command value Iref4.

The current command value Iref4 is inputted to a subtractor 105, and a deviation (Iref4-$i$) between the current command value Iref4 and a feedback current value i is calculated at the subtractor 105. The deviation (Iref4-$i$) is controlled by a PI-controller (proportional integral controller) 106, and then is inputted to a PWM-controller 107 in which a duty adjustment is performed. The PWM-controller 107 outputs the current control value E to an inverter 108, and the inverter 108 controls the motor 20 on the basis of the current control value E. The motor current value of the motor 20 is detected by a motor detection means 21, and is inputted to the subtractor 105 to be feed-backed.

A rotation sensor 22 such as a resolver is mounted on the motor 20, a motor rotation signal $\theta$ from the rotation sensor 22 is inputted to a motor angular speed calculating section 23, and the motor angular speed calculating section 23 calculates a motor angular speed $\omega$ which is a rotation angular speed of the motor 20. Furthermore, the motor angular speed $\omega$ is inputted to a motor angular acceleration calculating section 24, and the motor angular acceleration calculating section 24 calculates and outputs a motor angular acceleration $\omega^*$ which is a rotation angular acceleration of the motor 20.

The torque compensator 110 comprises, for instance, an SAT (Self Aligning Torque) estimating section 111, a differential compensator 112, a convergence controller 113 and an inertia compensator 114 and so on. The SAT estimating section 111 inputs the steering torque T, estimates and outputs an SAT-value SATa. The differential compensator 112 differentiates the steering torque T and outputs a steering torque TA for increasing a response speed. The SAT-value SATa and the steering torque TA which is differential compensated are inputted to a subtractor 115, and the deviation between the steering torque TA and the SAT-value TA is outputted. The convergence controller 113 outputs a convergence control value Ga on the basis of the motor angular speed $\omega$, the convergence control value Ga and the output of the subtractor 115 are added at an adder 116. In addition, the inertia compensator 114 outputs an inertia compensation value INa on the basis of the motor angular acceleration $\omega^*$, the inertia compensation value INa and the output of the adder 116 are added at an adder 117, the adder 117 outputs the compensation value Cm, and the compensation value Cm is inputted to the adder 103.

The SAT estimating section 111 stabilizes the vehicle behavior. The convergence controller 113 applies the brake to a swing operation of the steering wheel in order to improve the yaw-convergence characteristics of the vehicle. The inertia compensator 114 removes the torque that accelerates or decelerates the motor inertia from the steering torque, and makes a steering feeling that is without an inertia feeling.

In such an electric power steering apparatus, the motor 20 generating a steering assist force is connected to the steering mechanism through the reduction mechanism (the reduction gears 3). Since the friction of the reduction mechanism is large, the steering feeling is deteriorated by the friction. Therefore, there is a need to comprise the friction compensating function to improve the steering feeling in the electric power steering apparatus.

For example, an electric power steering apparatus is disclosed in Japanese Patent No. 3082483 (Patent Document 1). The electric power steering apparatus comprises a friction compensator to calculate a friction compensation value on the basis of a rotation direction of a motor, and the friction compensation is performed by adding the compensation value to an assist command for controlling the motor, thus a good steering wheel returning characteristic can be obtained from any let-go steering angle, and also the steering feeling can be improved.

Moreover, in an electric power steering apparatus disclosed in Japanese Patent Application Laid-Open No. 2005-170257 (Patent Document 2), it presumes that a static friction torque is generated when it is determined that a motor is in before-rotation-start state, and a static friction compensation control is performed by providing a motor with the static friction torque compensation current which is a result of multiplying a differential value of a steering torque by a predetermined coefficient. Furthermore, it presumes that a dynamic friction torque is generated when it is determined that the motor is in after-rotation-start state, a dynamic friction compensation control is performed by providing the motor with the dynamic friction torque compensation current which is getting closer to a predetermined current value gradually until it is equal to the predetermined current value.

DOCUMENT LIST

Patent Documents

Patent Document 1: Japanese Patent No. 3082483
Patent Document 2: Japanese Patent Application Laid-Open No. 2005-170257

Problems to be Solved by the Invention

In an electric power steering apparatus, an amount of the friction in the reduction mechanism is nearly proportional to the force acting to the reduction mechanism. Therefore, in the electric power steering apparatus disclosed in Patent Document 1, the friction compensation becomes so large that the handle steering becomes overly light when the steering assist force becomes small near the center of the steering wheel, the friction compensation becomes small so that the handle steering becomes heavy when the steering assist force becomes large during a turning operation. Moreover, since the friction compensation is performed only while the motor is rotating, there is a problem that the static friction cannot be compensated and the friction cannot be sufficiently compensated during a start-steering operation or a minute steering operation in which the steering torque is small.

Moreover, in the electric power steering apparatus disclosed in Patent Document 2, when a compensation for the static friction torque is performed, the static friction torque compensation current is calculated from a differential value of the steering torque, but since the rate of change of the steering torque is small at a time of a minute steering operation in which the steering torque is small, there is a problem that the friction cannot be sufficiently compensated.

The present invention is devised in order to solve the above problems, and the object of the present invention is to provide an electric power steering apparatus that compensates both a static friction and a dynamic friction, performs the switching between a static friction compensation and a dynamic friction compensation smoothly and without unpleasant sensation in order to achieve a natural comfortable steering feeling.

Means for Solving the Problems

The present invention relates to an electric power steering apparatus wherein a current command value is calculated based on at least a steering torque, and a motor is controlled by a current control value calculated based on said current command value to provide a steering assist force to a steering mechanism, and the above-described object of the present invention is achieved by the electric power steering apparatus in which a friction compensator is provided to calculate a friction compensation value for compensating friction to said steering mechanism on the basis of said steering torque, and said current command value is corrected by said friction compensation value. It is good that said steering mechanism has an expandable and contractive intermediate shaft.

The above-described object of the present invention is more effectively achieved by the electric power steering apparatus in which said friction compensator sets a steering torque target value range which has a predetermined range based on said steering torque, and calculates said friction compensation value in accordance with a difference between said steering torque and an intermediate value of said steering torque target value range; or said steering torque target value range is composed of a small range 1 around said intermediate value and a large range 2 around said range 1, and said friction compensator sets said friction compensation value to be "0" when said steering torque is inside said range 1, calculates said friction compensation value in accordance with a difference between said steering torque and said intermediate value of said steering torque target value range when said steering torque is outside said range 1 but inside said range 2, updates said intermediate value and sets said steering torque target value range again when said steering torque is outside said ranges 1 and 2 so that said steering torque becomes inside said steering torque target value range; or said friction compensator comprises a friction compensation value calculating section calculating a friction compensation calculating value in accordance with said steering torque, and a gain calculating section calculating at least one gain by which said friction compensation calculating value is multiplied, calculates said friction compensation value by multiplying said friction compensation calculating value by said at least one gain; or said friction compensation value calculating section sets a steering torque target value range which has a predetermined range based on said steering torque, and calculates said friction compensation calculating value in accordance with a difference between said steering torque and an intermediate value of said steering torque target value range; or said steering torque target value range is composed of a small range 1 around said intermediate value and a large range 2 around said range 1, and said friction compensation value calculating section sets said friction compensation calculating value to be "0" when said steering torque is inside said range 1, calculates said friction compensation calculating value in accordance with a difference between said steering torque and said intermediate value of said steering torque target value range when said steering torque is outside said range 1 but inside said range 2, updates said intermediate value and sets said steering torque target value range again when said steering torque is outside said ranges 1 and 2 so that said steering torque becomes inside said steering torque target value range; or said gain calculating section includes a velocity-sensitive gain calculating section calculating a velocity-sensitive gain which is determined in accordance with a velocity, and said velocity-sensitive gain is one of said gains; or said velocity-sensitive gain can be set in accordance with a value of said velocity; or said gain calculating section includes a motor angular speed-sensitive gain calculating section calculating a motor angular speed-sensitive gain which is determined in accordance with a motor angular speed, and said motor angular speed-sensitive gain is one of said gains; or said motor angular speed-sensitive gain can be set in accordance with a value and direction of said motor angular speed; or said gain calculating section comprises a current control value-sensitive gain calculating section calculating a current control value-sensitive gain which is determined in accordance with said current control value, and said current control value-sensitive gain is one of said gains; or said current control value-sensitive gain can be set in accordance with a value and direction of said current control value; or said gain calculating section includes a steering torque-sensitive gain calculating section calculating a steering torque-sensitive gain which is determined in accordance with said steering torque, and said steering torque-sensitive gain is one of said gains; or said steering torque-sensitive gain can be set in accordance with a value and direction of said steering torque.

Effects of the Invention

According to the electric power steering apparatus of the present invention, the friction compensation value for compensating the friction is calculated based on the steering torque, and the current command value is corrected by the calculated friction compensation value, so both the static friction and the dynamic friction of the electric power steering apparatus can be compensated, meanwhile the switching between the compensation for the static friction and the compensation for the dynamic friction can be performed smoothly and without any uncomfortable feeling. Furthermore, since the friction can be compensated accurately even in the minute steering operation in which the steering torque is small, a more natural and comfortable steering feeling can be obtained.

Moreover, according to the electric power steering apparatus of the present invention, the electric power steering apparatus is velocity-sensitive, and/or motor angular speed-sensitive, and/or current control value-sensitive, and/or steering torque-sensitive, so an appropriate friction compensation is performed according to travelling state of the vehicle, a steer feeling with high stability can be obtained.

An intermediate shaft mechanism in which an expansion/contraction shaft (intermediate shaft) is disposed in a middle part of the column shaft in the steering mechanism is used recently for solving the problems on assembling the steering mechanism, and for the purpose such as absorbing the displacement in the axis direction and the vibration caused while the vehicle is running, the friction compensation according to the present invention also has a large effect to the steering mechanism equipped with the intermediate shaft.

MODE FOR CARRYING OUT THE INVENTION

The friction (static friction, dynamic friction) of a reduction mechanism of an electric power steering apparatus is large, so it is necessary to perform a friction compensation to prevent the steering feeling from being deteriorated by the friction. The electric power steering apparatus according to the present invention performs the friction compensation by calculating a friction compensation value based on a steering torque and correcting a current command value for controlling a motor by using the friction compensation value, and performs the switching between a compensation for the static friction and a compensation for the dynamic friction smoothly and without unpleasant sensation, thereby to obtain more natural and comfortable steering feeling.

Hereinafter, embodiments of the present invention will be described with reference to the drawings.

Figure 2:
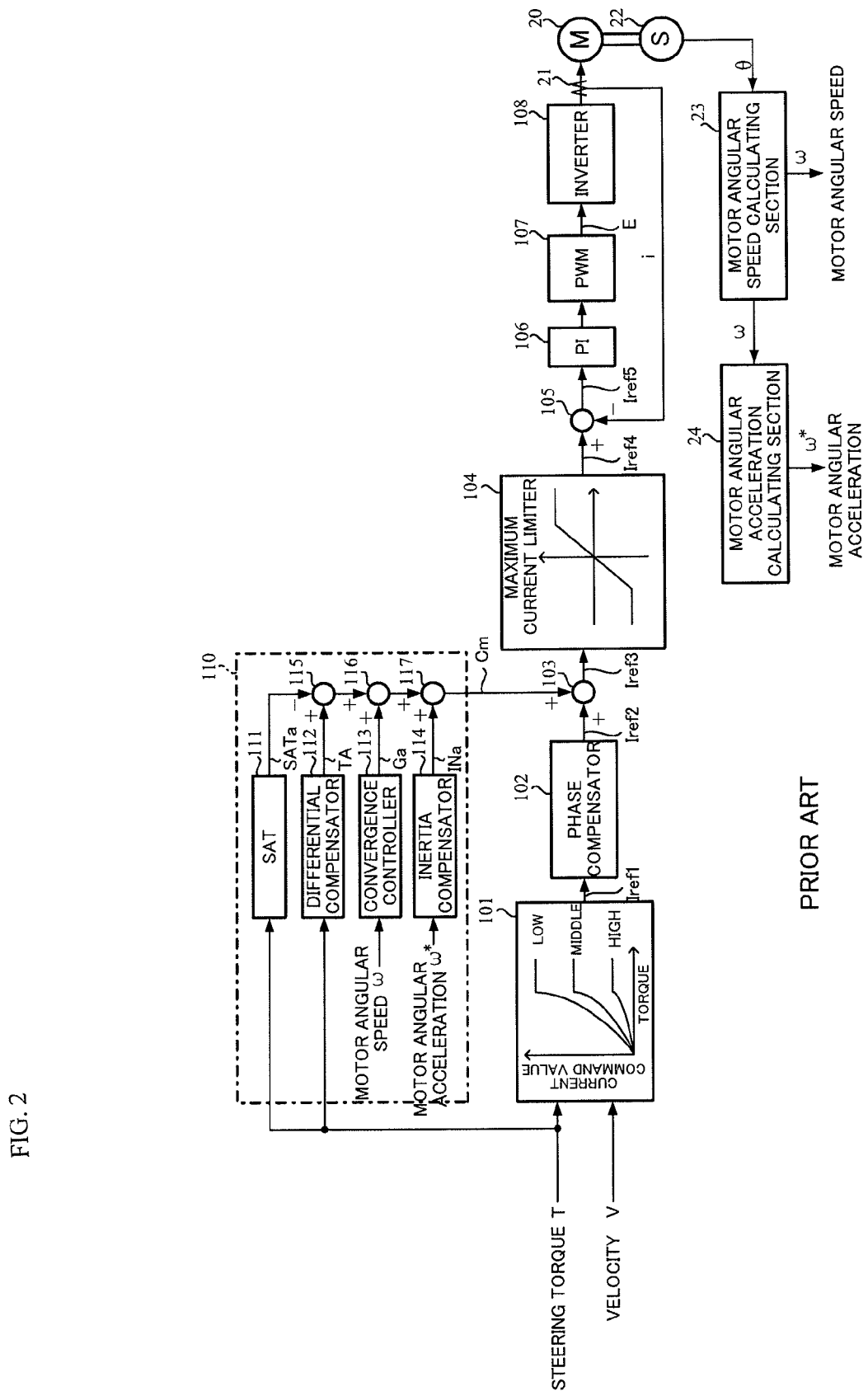
FIG. 2 is a block diagram showing a configuration example of a control unit of a conventional electric power steering apparatus.
Figure 3:
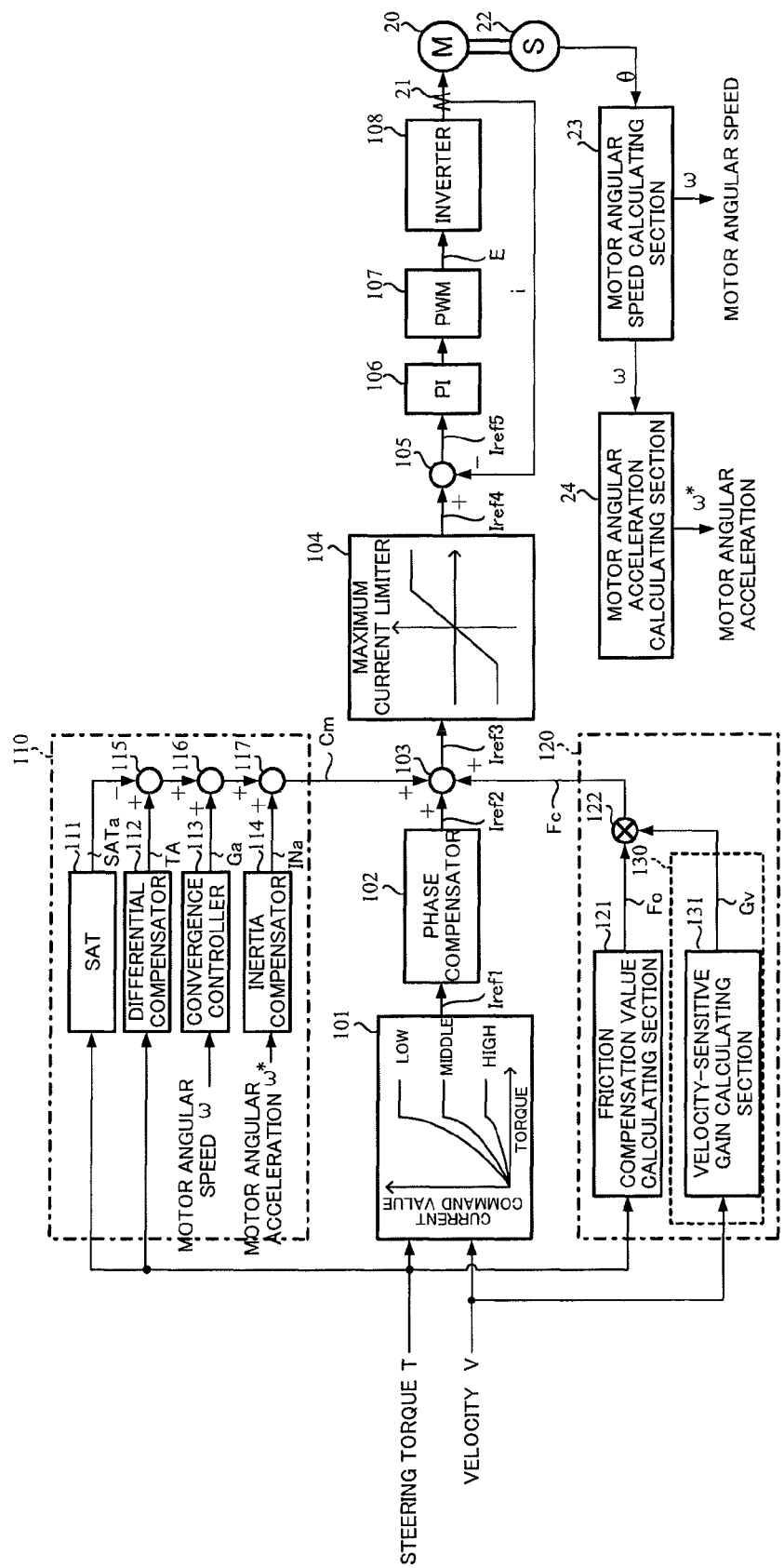
FIG. 3 is a block diagram showing a configuration example of a control unit (the first embodiment of a friction compensator) of an electric power steering apparatus according to the present invention.

FIG. 3 is a block diagram showing a configuration example of a control unit 100 of an electric power steering apparatus according to the present invention as corresponding to FIG. 2. As shown in FIG. 3, the electric power steering apparatus according to the present invention comprises a friction compensator 120 which inputs a steering torque T and a velocity V and outputs a friction compensation value Fc.

The friction compensator 120 is the fist embodiment of the present invention, it comprises a friction compensation value calculating section 121 which calculates a friction compensation calculating value Fo based on the steering torque T, a gain calculating section 130 calculating at least one gain that is for multiplying the friction compensation calculating value Fo, and a multiplier 122 which multiplies the friction compensation calculating value Fo by a gain Gv calculated by the gain calculating section 130. In the first embodiment shown in FIG. 3, the gain calculating section 130 comprises a velocity-sensitive gain calculating section 131 which calculates a velocity-sensitive gain Gv in accordance with the velocity V, and the multiplier 122 outputs a result of multiplying the friction compensation calculating value Fo with the velocity-sensitive gain Gv as the friction compensation value Fc.

The friction compensation value Fc is added to the current command value Iref2 at the adder 103 with the torque compensation value Cm calculated by the torque compensator 110. Then, the adder 103 outputs a current command value Ifre3 in which the friction compensation is performed. As aforementioned, the current command value Iref3 is inputted to the maximum current limiter 104, the maximum current limiter 104 limits the maximum of the current, furthermore, the PI-control and the PWM-control are respectively performed in the PI-controller 106 and the PWM-controller 107, and the current control value E is calculated. The current control value E is inputted to the inverter 108, and the inverter 108 drives and controls the motor 20 based on the current control value E.

Figure 4:
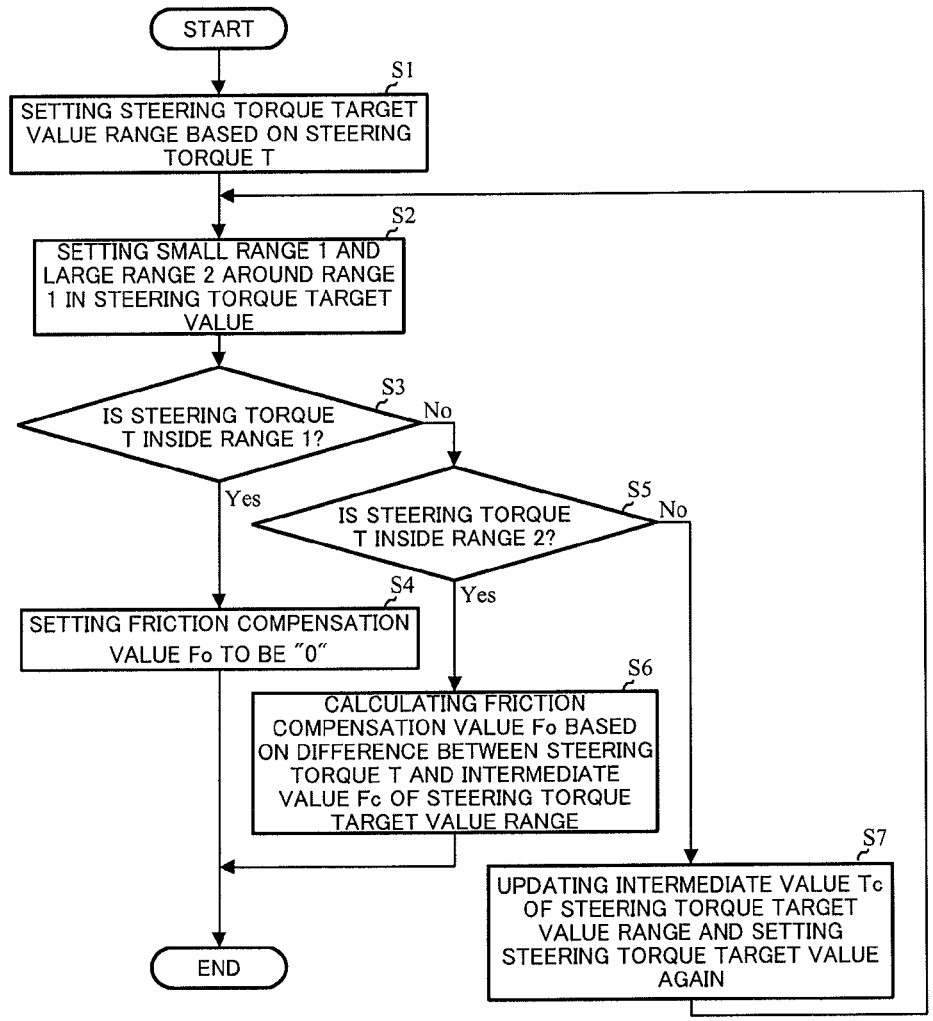
FIG. 4 is a flowchart showing an example of the procedure that a friction compensation value calculating section calculates a friction compensation value.

With such a configuration as described above, an operation example of the friction compensation value calculating section 121 will be described with reference to FIG. 4.

The friction compensation value calculating section 121 sets a steering torque target value range with a predetermined range width on the basis of the inputted steering torque T (Step S1). At this time, an intermediate value Tc showing the intermediate value of the predetermined range width of the steering torque target value range is set to be the same value as the steering torque T. Then, the friction compensation value calculating section 121 sets a first range 1 which is small and around the intermediate value Tc of the steering torque target value range, and a second range 2 which is large and around the first range 1 in the steering torque target value range, thereby the steering torque target value range is composed of the first range 1 and the second range 2 (Step S2). The intermediate value Tc of the steering torque target value range, the first range 1 and the second range 2 will be explained later.

Next, it is determined whether or not the steering torque T is inside the first range 1 of the steering torque target value range (Step S3). If the steering torque T is inside the first range 1 of the steering torque target range, the friction compensation is not performed by setting the friction compensation calculating value Fo to "0" (Step S4). At the Step S3 aforementioned, when it is determined that the steering torque T is outside the first range 1 of the steering torque target value range, it is determined whether or not the steering torque T is inside the second range 2 of the steering torque target value range (Step S5). Then, when the steering torque T is inside the second range 2 of the steering torque target value range, the friction compensation calculating value Fo is calculated in accordance with a difference between the steering torque T and the intermediate value Tc of the steering torque target value range (Step S6).

Meanwhile, at the Step S5 aforementioned, when it is determined that the steering torque T is outside both the first range 1 and the second range 2 of the steering torque target value range, the steering torque target value range is set again by updating the intermediate value Tc of the steering torque target value range so that the steering torque T becomes inside the steering torque target value range, and returns to the Step S2 aforementioned. Then, the friction compensation value calculating section 121 calculates the friction compensation calculating value Fo based on the updated steering torque target value range again.

Figure 5:
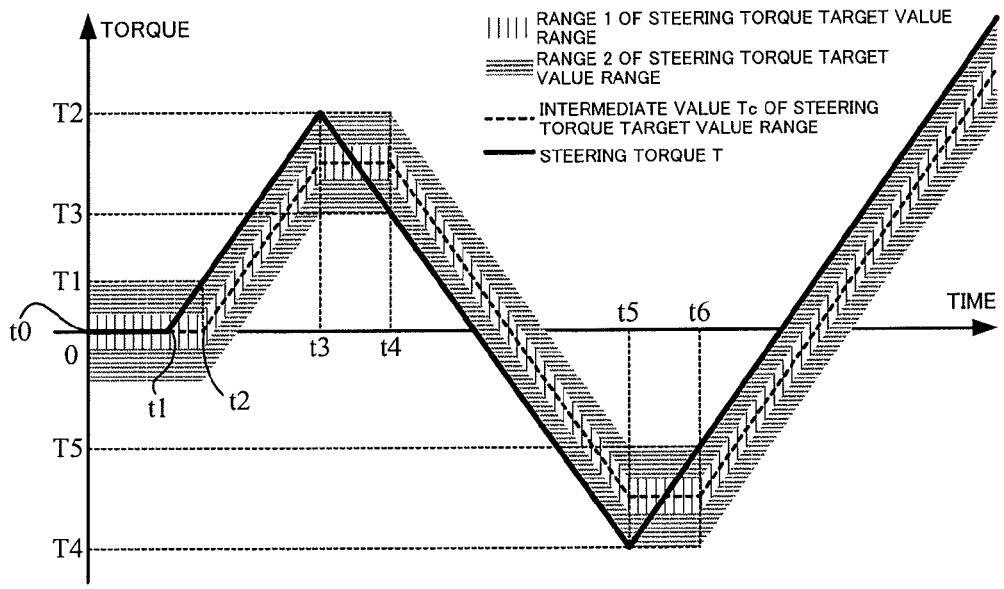
FIG. 5 is a characteristic diagram showing how a steering torque target value range changes with the time change of a steering torque T.

FIG. 5 shows how the steering torque target value range changes accompanying the time change of the steering torque T, the steering torque T is shown by the solid line, the first range 1 of the steering torque target value range is shown by pinstripes, the second range 2 of the steering torque target value range is shown by horizontal stripes, and the intermediate value Tc of the steering torque target value range is shown by the dashed line. In addition, the value "0" is used as a reference value to show that the steering direction is divided into right and left.

The steering torque T is a constant value "0" from a time point t0 to a time point t1 as shown in FIG. 5. In this case, the first range 1 and the second range 2 of the steering torque target value range are set to be around the steering torque T, the intermediate value Tc of the steering torque target value range is the same as the steering torque T. Since the steering torque T is inside the first range 1 of the steering torque target value range at this time, the friction compensation calculating value Fo is set to "0", and the friction compensation is not performed.

The steering torque T increases from "0" after the time point t1, and increases to a steering torque T1 (>0) at a time point t2. Since the steering torque T is inside the steering torque target value range before the time point t2 even without updating the intermediate value Tc of the steering torque target value range, the intermediate value Tc of the steering torque target value range is steady, and the steering torque target value range is maintained in a constant range. Thereby from the time point t1 to the time point t2, the friction compensation is not performed by a friction compensation calculating value Fo equal to "0" when the steering torque T is inside the first range 1 of the steering torque target value range; the friction compensation calculating value Fo is calculated based on the difference between the steering torque T and the intermediate value Tc of the steering torque target value range when the steering torque T is outside the first range 1 but inside the second range 2 of the steering torque target value range.

Furthermore, the steering torque T continues increasing until a time point t3 and reaches a steering torque T2 (>T1) at the time point t3. From the time point t2 to the time point t3, the steering torque T will become outside the second range 2 of the steering torque target value range, when the intermediate value Tc is not updated and the steering torque target value range is not set again. Therefore, the intermediate value Tc of the steering torque target value range is updated and the steering target value range is set again such that the steering torque T becomes inside the steering target value range. At this time, since the steering torque T is outside the first range 1 but inside the second range 2 of the steering torque target value range that is set again, the friction compensation calculating value Fo is calculated in accordance with the difference between the steering torque T and the intermediate value Tc of the steering torque target value range.

Then, the steering torque T begins to decrease from "T2" after the time point t3, and reaches a steering torque T3 (<T2) at a time point t4. From the time point t3 to the time point t4, the steering torque T is inside the steering torque target value range, thereby the intermediate value Tc of the steering torque target value range is constant and the steering torque target value range is also maintained in a constant range. So the friction compensation is not performed by the friction compensation calculating value Fo equal to "0" when the steering torque T is inside the first range 1 of the steering torque target value range; the friction compensation calculating value Fo is calculated in accordance with the difference between the steering torque T and the intermediate value Tc of the steering torque target value range when the steering torque T is outside the first range 1 but inside the second range 2 of the steering torque target value range.

Furthermore, the steering torque continues decreasing until a time point t5, and reaches a steering torque T4 at the time point t5. From the time point t4 to the time point t5, the intermediate value Tc of the steering torque target value range is updated and the steering target value range is set again so that the steering torque T becomes inside the steering target value range. At this time, since the steering torque T is outside the first range 1 but inside the second range 2 of the steering torque target value range that is set again, the friction compensation calculating value Fo is calculated in accordance with the difference between the steering torque T and the intermediate value Tc of the steering torque target value range.

The steering torque T increases after the time point t5 and reaches "T5" (<0) at a time point t6. From the time point t5 to the time point t6, the steering torque target value range is maintained in a constant range, and the friction compensation calculating value Fo is calculated. Then, the intermediate value Tc of the steering torque target value range is updated and the steering torque target value range is set again so that the steering torque T becomes inside the steering torque target value range, and the friction compensation calculating value Fo is calculated based on the steering torque target value range that is set again.

Additionally, the width of the first range 1 and the second range 2 of the steering torque target value range can be set to arbitrary width. For instance, it is good to set the first range 1 to a range whose center is the intermediate value Tc and which has a width of 0.1 Nm (±0.05 Nm), and set the second range 2 to a range obtained by removing the first range 1 from a width of 0.4 Nm (±0.2 Nm) whose center is the intermediate value Tc.

In the first embodiment shown in FIG. 3, the friction compensation calculating value Fo calculated by the friction compensation value calculating section 121 as aforementioned is multiplied by the velocity-sensitive gain Gv calculated by the velocity-sensitive gain calculating section 131 in the multiplier 122. The velocity-sensitive gain Gv has a characteristic that the velocity-sensitive gain Gv is large when the velocity V is small; the velocity-sensitive gain Gv is small when the velocity V is large, and the velocity-sensitive gain Gv is "0" when the velocity is "0".

Figure 6:
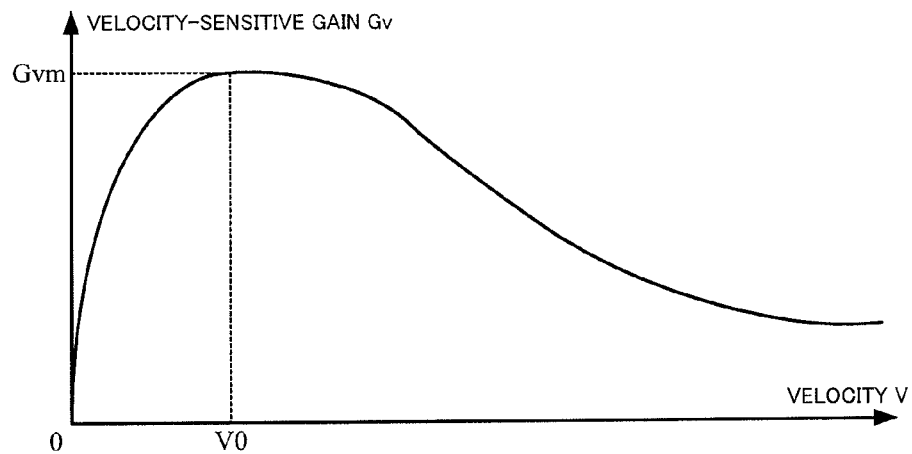
FIG. 6 is a characteristic diagram showing the relationship example between a velocity and a velocity-sensitive gain.

FIG. 6 shows a relationship example between the velocity V and the velocity-sensitive gain Gv. The velocity-sensitive gain Gv is "0" when the velocity is "0", and the velocity-sensitive gain Gv monotonously increases with the increase in the velocity V when the velocity V is smaller than a predetermined velocity V0 that is larger than "0", and goes to the maximum Gvm when the velocity V is equal to the predetermined velocity V0, and then the velocity-sensitive gain Gv monotonously decreases with the increasing of the velocity V when the velocity V is larger than the predetermined velocity V0. Moreover, the characteristics of the monotone increasing and the monotone decreasing can be either linear or nonlinear.

Figure 7:
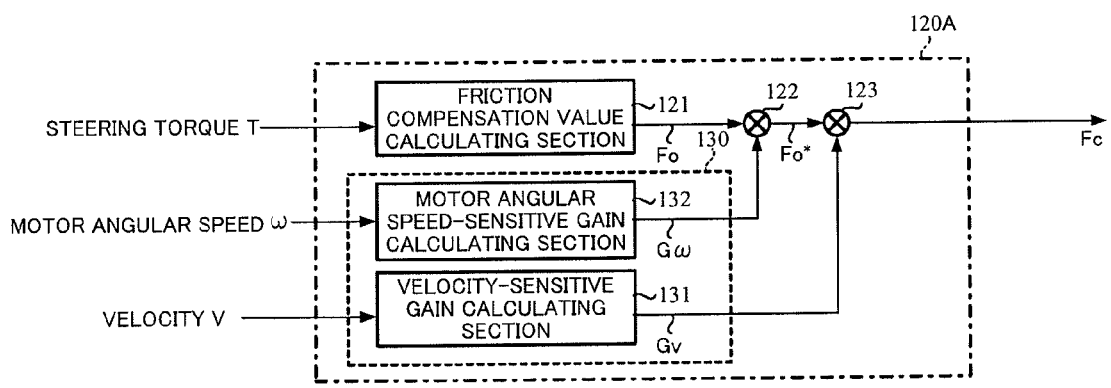
FIG. 7 is a block diagram showing the second embodiment of a friction compensator of an electric power steering apparatus according to the present invention.

Next, a friction compensator 120A of the second embodiment of the present invention will be described with reference to FIG. 7. The friction compensator 120A comprises a friction compensation value calculating section 121 calculating the friction compensation calculating value Fo on the basis of the steering torque T, and a gain calculating section 130A inputting the motor angular speed ω and the velocity V, and two multipliers 122 and 123. The gain calculating section 130A comprises a motor angular speed-sensitive gain calculating section 132 and a velocity-sensitive gain calculating section 131. The motor angular speed-sensitive gain calculating section 132 calculates a motor angular speed-sensitive gain Gω that is determined in accordance with the motor angular speed ω, and the velocity-sensitive gain calculating section 131 calculates a velocity-sensitive gain Gv that is determined in accordance with the velocity V.

The friction compensation value calculating section 121 calculates the friction compensation calculating value Fo on the basis of the steering torque T in accordance with the same points as the aforementioned first embodiment and inputs it to the multiplier 122. Moreover, the motor angular speed-sensitive gain Gω calculated by the motor angular speed-sensitive gain calculating section 132 is inputted to the multiplier 122. The friction compensation calculating value Fo and the motor angular speed-sensitive gain Gω are multiplied in the multiplier 122, then a multiplied result is outputted to the multiplier 123 as a multiplied result Fo*. Furthermore, the velocity-sensitive gain Gv calculated by the velocity-sensitive gain calculating section 131 is inputted to the multiplier 123, and the velocity-sensitive gain Gv and the multiplied result Fo* are multiplied in the multiplier 123, then a multiplied result is outputted as the friction compensation value Fc. The friction compensation value Fc is added to the current command value Iref2 at the adder 103 with the torque compensation value Cm calculated by the torque compensator 110 as the above-mentioned.

Further, an order to multiply the motor angular speed-sensitive gain Gω and the velocity-sensitive gain Gv in the multipliers 122 and 123 is arbitrary.

A relationship between the motor angular speed ω and the motor angular speed-sensitive gain Gω calculated by the motor angular speed-sensitive gain calculating section 132 is a characteristic that the motor angular speed-sensitive gain Gω is a limited value not equal to "0" when the motor angular speed ω is small, and the motor angular speed-sensitive gain Gω becomes small when the motor angular speed ω is large.

Figure 8:
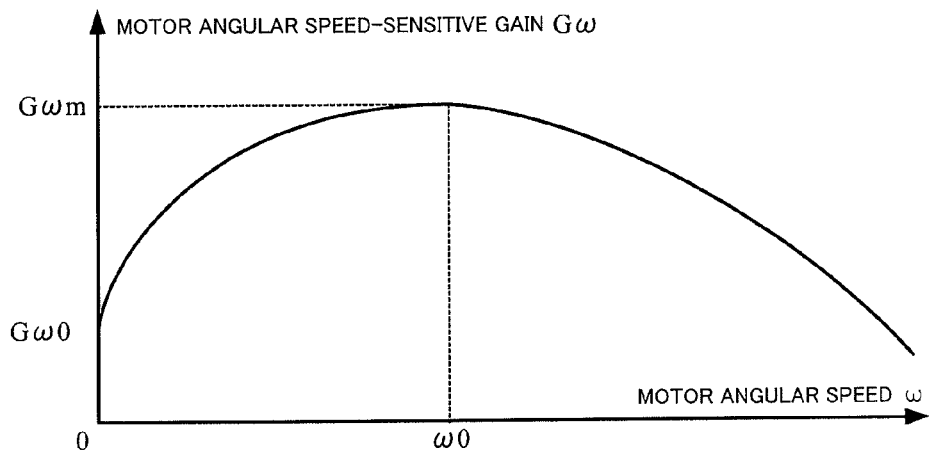
FIG. 8 is a characteristic diagram showing the relationship example between a motor angular speed and a motor angular speed-sensitive gain.

FIG. 8 shows a relationship example between the motor angular speed ω and the motor angular speed-sensitive gain Gω. The motor angular speed-sensitive gain Gω is a limited value Gω0 not equal to "0" when the motor angular speed ω is "0", and the motor angular speed-sensitive gain Gω monotonously increases with the increase in the motor angular speed ω when the motor angular speed ω is larger than "0" but smaller than a predetermined motor angular speed ω0, and goes to the maximum Gωm when the motor angular speed is equal to the predetermined motor angular speed ω0, the motor angular speed-sensitive gain Gω monotonously decreases with the increase in the motor angular speed ω when the motor angular speed ω is larger than the predetermined motor angular speed ω0. Moreover, the characteristics of the monotone increasing and the monotone decreasing can be either linear or nonlinear.

Figure 9:
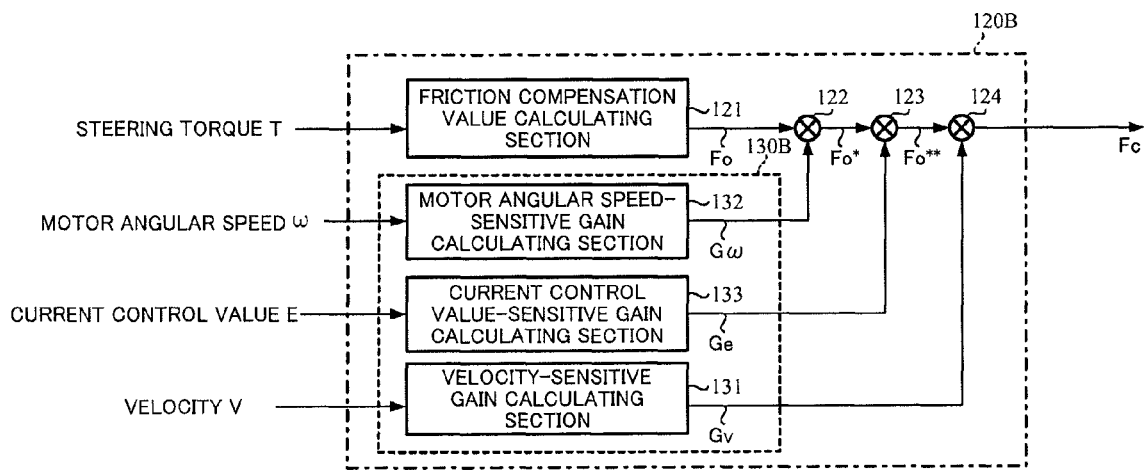
FIG. 9 is a block diagram showing the third embodiment of a friction compensator of an electric power steering apparatus according to the present invention.

Next, a friction compensator 120B of the third embodiment of the present invention will be described with reference to FIG. 9. The friction compensator 120B comprises the friction compensation value calculating section 121 calculating the friction compensation calculating value Fo on the basis of the steering torque T, a gain calculating section 130B inputting the motor angular speed ω, the current control value E and the velocity V, and three multipliers 122 to 124. The gain calculating section 130B comprises a motor angular speed-sensitive gain calculating section 132, a current control value-sensitive gain calculating section 133 and a velocity-sensitive gain calculating section 131. The motor angular speed-sensitive gain calculating section 132 calculates a motor angular speed-sensitive gain Gω that is determined in accordance with the motor angular speed ω, the current control value-sensitive gain calculating section 133 calculates a current control value-sensitive gain Ge that is determined in accordance with the current control value E, and the velocity-sensitive gain calculating section 131 calculates a velocity-sensitive gain Gv that is determined in accordance with the velocity V.

The friction compensation value calculating section 121 calculates the friction compensation calculation value Fo on the basis of the steering torque T in accordance with the same points as the aforementioned embodiments and inputs it to the multiplier 122. The friction compensation calculating value Fo and the motor angular speed-sensitive gain Gω are multiplied in the multiplier 122, a multiplied result is outputted to the multiplier 123 as a multiplied result Fo* and is multiplied by the current control value-sensitive gain Ge, furthermore, a multiplied result Fo** thereof is inputted to the multiplier 124 and multiplied by the velocity-sensitive gain Gv, then a multiplied result is outputted as the friction compensation value Fc. The friction compensation value Fc is inputted to the adder 103 and added to the current command value Iref2 with the torque compensation value Cm calculated by the torque compensator 110.

Furthermore, an order to multiply the motor angular speed-sensitive gain Gω, the current control value-sensitive gain Ge and the velocity-sensitive gain Gv in the multipliers 122 to 124 is arbitrary.

Figure 10:
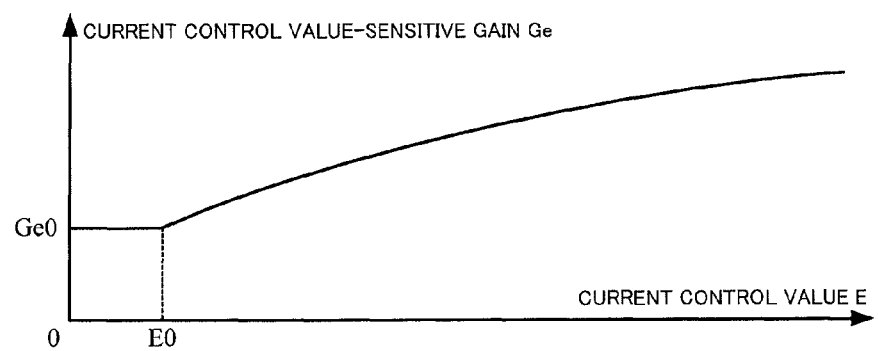
FIG. 10 is a characteristic diagram showing the relationship example between a current control value and a current control value-sensitive gain.

The current control value-sensitive gain calculating section 133 sets the current control value-sensitive gain Ge to be a predetermined value when the current control value E is small, and the current control value-sensitive gain Ge will become large if the current control value E becomes large. A relationship between the current control value E and the current control value-sensitive gain Ge is shown in FIG. 10 for instance, the current control value-sensitive gain Ge is a constant predetermined value Ge0 when the current control value is between "0" and a predetermined current control value E0, and the current control value-sensitive gain Ge monotonously increases with the increase in the current control value E when the current control value E is larger than the predetermined current control value E0. The increasing characteristic can be either linear or nonlinear.

Figure 11:
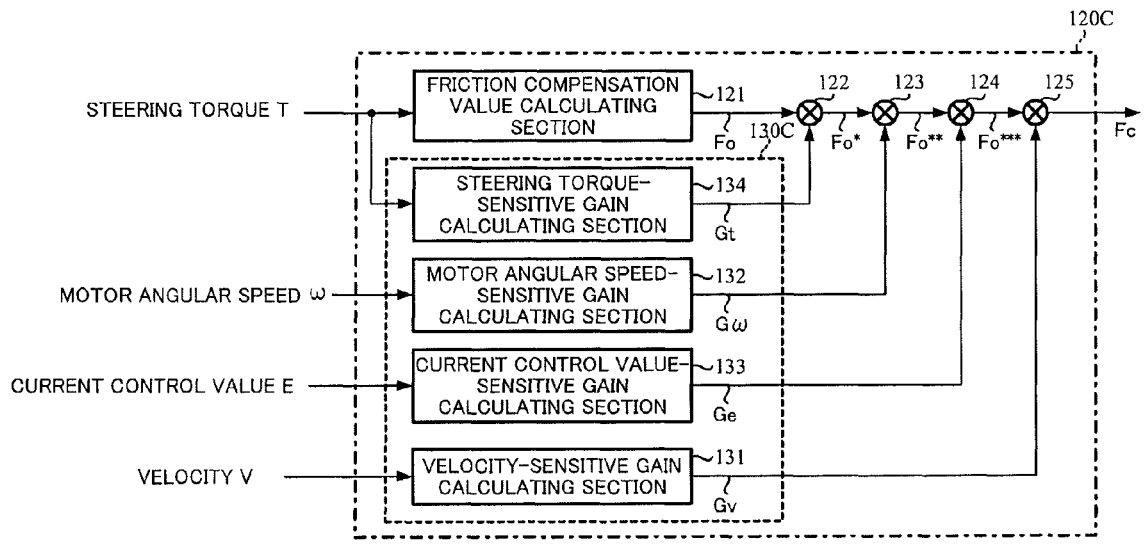
FIG. 11 is a block diagram showing the fourth embodiment of a friction compensator of an electric power steering apparatus according to the present invention.

Next, a friction compensator 120C of the fourth embodiment of the present invention will be described with reference to FIG. 11. A friction compensator 120C of the fourth embodiment comprises the friction compensation value calculating section 121 calculating the friction compensation calculating value Fo on the basis of the steering torque T, a gain calculating section 130C inputting the steering torque T, the motor angular speed ω, the current control value E and the velocity V, and four multipliers 122 to 125. The gain calculating section 130C comprises a steering torque-sensitive gain calculating section 134, the motor angular speed-sensitive gain calculating section 132, the current control value-sensitive gain calculating section 133 and the velocity-sensitive gain calculating section 131. The steering torque-sensitive gain calculating section 134 calculates a steering torque-sensitive gain Gt that is determined in accordance with the steering torque T, the motor angular speed-sensitive gain calculating section 132 calculates a motor angular speed-sensitive gain Gω that is determined in accordance with the motor angular speed ω, the current control value-sensitive gain calculating section 133 calculates a current control value-sensitive gain Ge that is determined in accordance with the current control value E, and the velocity-sensitive gain calculating section 131 calculates a velocity-sensitive gain Gv that is determined in accordance with the velocity V.

The friction compensation value calculating section 121 calculates the friction compensation calculating value Fo on the basis of the steering torque T in accordance with the same points as the aforementioned embodiments and inputs it to the multiplier 122. The friction compensation calculating value Fo and the steering torque-sensitive gain Gt are multiplied in the multiplier 122, and a multiplied result Fo* is inputted to the multiplier 123, the multiplied result Fo* and the motor angular speed-sensitive gain Gω are multiplied in the multiplier 123, and a multiplied result Fo is multiplied by the current control value-sensitive Ge in the multiplier 124. Furthermore, a multiplied result Fo* is multiplied by the velocity-sensitive gain Gv, and then a multiplied result is outputted as the friction compensation value Fc. The friction compensation value Fc is inputted to the adder 103 with the torque compensation value Cm calculated by the torque compensator 110, then the current command value Iref2 is corrected.

Furthermore, an order to multiply the steering torque-sensitive gain Gt, the motor angular speed-sensitive gain Gω, the current control value-sensitive gain Ge and the velocity-sensitive gain Gv in the multipliers 122 to 125 is arbitrary.

Figure 12:
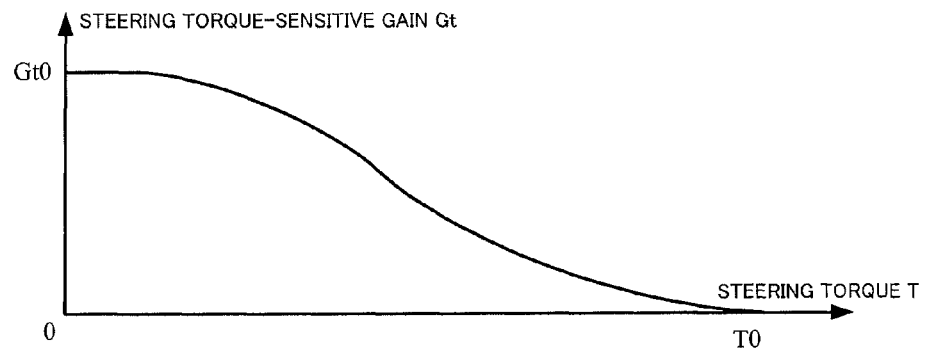
FIG. 12 is a characteristic diagram showing the relationship example between a steering torque and a steering torque-sensitive gain.

The characteristic of the steering torque-sensitive gain Gt is that the steering torque-sensitive gain Gt is a large value when the steering torque T is small, decreases with the increase of the steering torque T, and becomes "0" finally. For instance, a relationship between the steering torque T and the steering torque-sensitive gain Gt is shown in FIG. 12. The steering torque-sensitive gain Gt is a predetermined value Gt0 when the steering torque T is "0". The steering torque-sensitive gain Gt monotonously decreases with the increase of the steering torque T from "0", and becomes "0" when the steering torque T increases to a predetermined steering torque T0. The decreasing characteristic can be either linear or nonlinear.

In the electric power steering apparatus according to the present invention, it is also good that the friction compensators 120 to 120C do not have the gain calculating sections 130 to 130C, respectively, and makes the friction compensation calculating value Fo calculated by the friction compensation value calculating section 121 as the friction compensation value Fc. Moreover, it is good that the gain calculating sections 130 to 130C have at least one of the velocity-sensitive gain calculating section 131, the motor angular speed-sensitive gain calculating section 132, the current control value-sensitive gain calculating section 133 and the steering torque-sensitive gain calculating section 134 arbitrarily.

In the electric power steering apparatus according to the present invention, there are the following effects in multiplying the friction compensation calculating value Fo by the velocity-sensitive gain Gv, and/or the motor angular speed-sensitive gain Gω, and/or the current control value-sensitive gain Ge, and/or the steering torque-sensitive gain Gt. When the velocity V is large, and/or the motor angular speed ω is large, and/or the steering torque T is large, the gains by which the friction compensation calculating value Fo is multiplied are set to be small, thereby the friction compensation value Fc becomes small, and it is able to prevent the steering from becoming too light and turning to a steering-quick state too much. When the velocity V is small, and/or the motor angular speed ω is small, and/or the current control value E is small, and/or the steering torque is small, the steering characteristic (vehicle behavior) is smoothened by calculating the friction compensation value Fc based on the proper gains by which the friction compensation calculating value Fo is multiplied.

Figure 1:
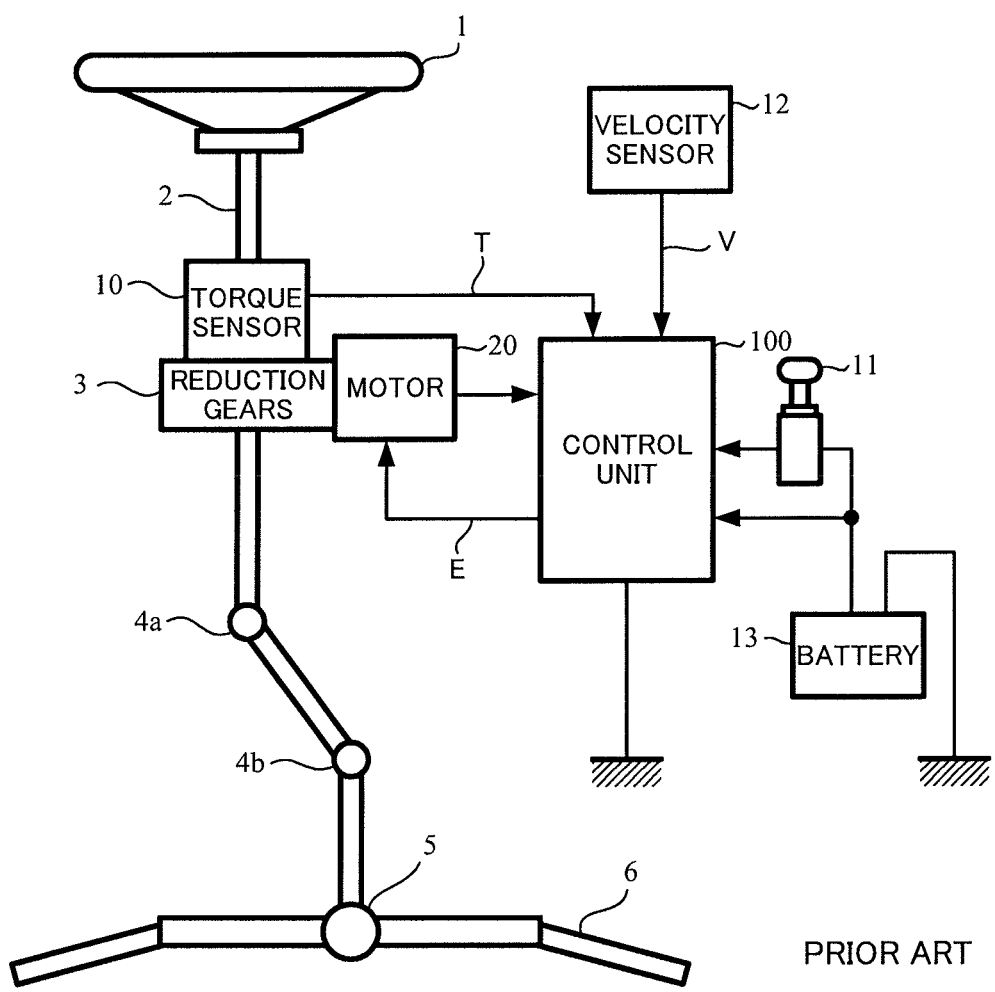
FIG. 1 is a diagram illustrating an example of a general electric power steering apparatus.
Figure 13:
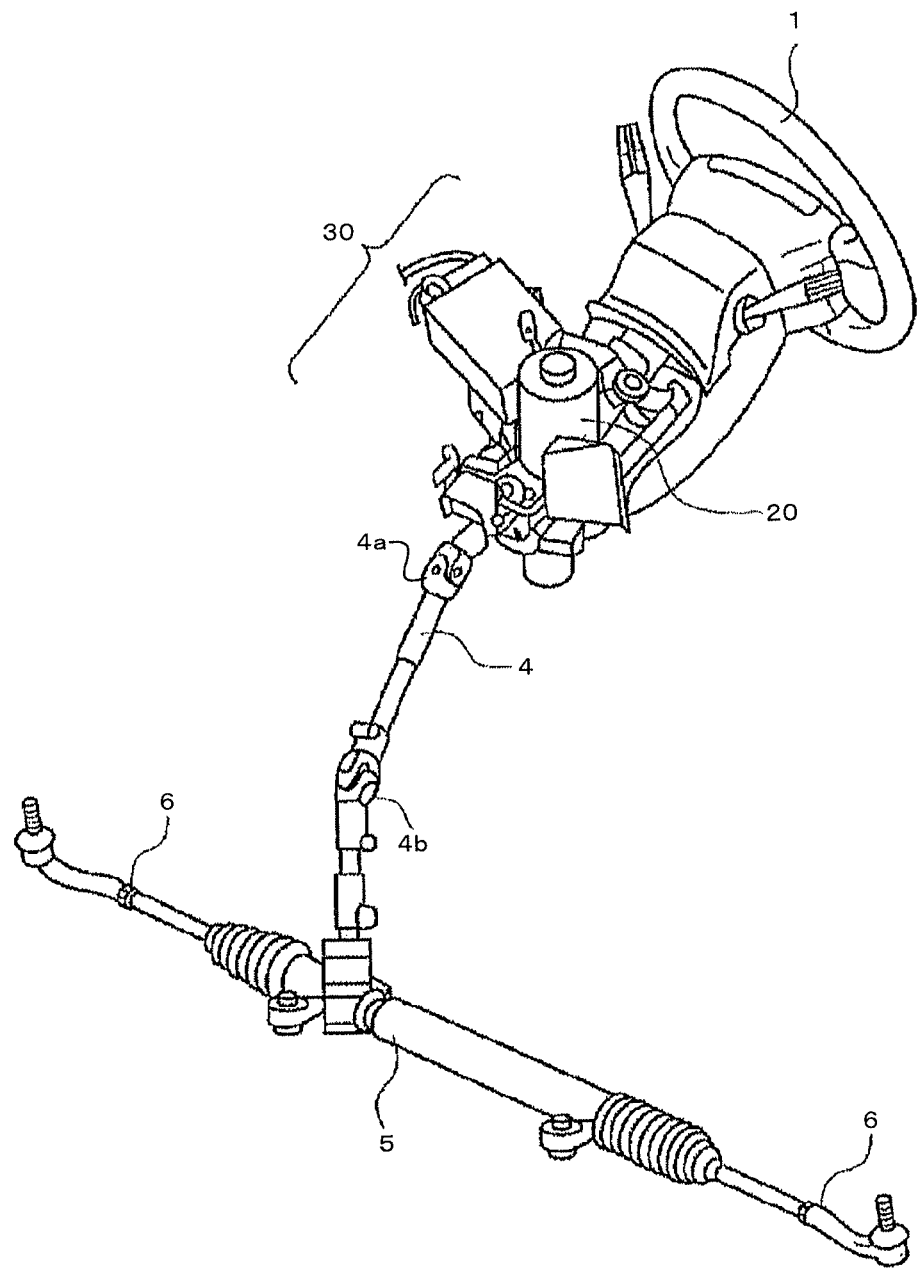
FIG. 13 is an appearance diagram to show an electric power steering apparatus comprising an intermediate shaft (expansion/contraction shaft)

An intermediate shaft mechanism in which an expansion/contraction shaft (intermediate shaft) is disposed in the middle part of the column shaft of the steering mechanism is used recently for solving the problems on assembling the steering mechanism, and for the purpose such as absorbing the displacement in the axis direction and the vibration caused while the vehicle is running. FIG. 13 shows the appearance of the steering mechanism comprising the intermediate shaft as corresponding to FIG. 1. The motor 20 is installed in a drive mechanism section 30 that is equipped with the torque sensor, the reduction gears, etc., an expandable and contractive intermediate shaft 4 is disposed between the universal joints 4a and 4b that are the middle part of the column shaft.

Figure 14:
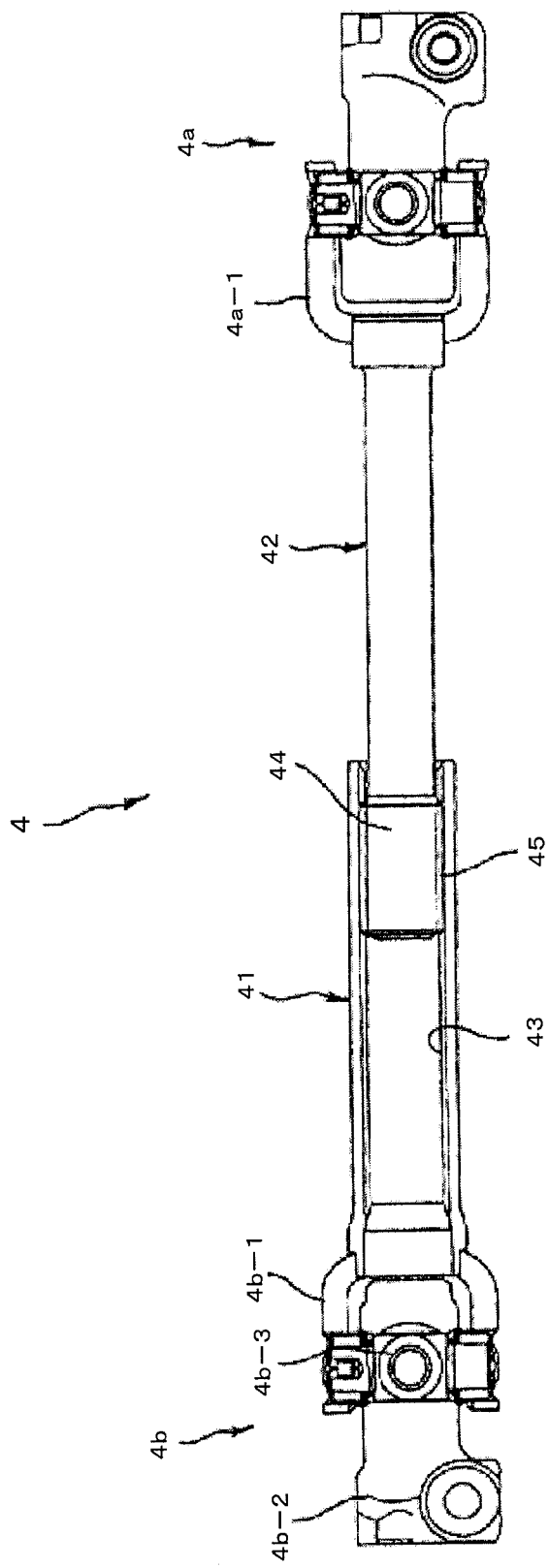
FIG. 14 is an enlarged view of a main portion of an intermediate shaft.

The details of the intermediate shaft 4 are the structure shown in FIG. 14, for instance. That is, the intermediate shaft 4 comprises an outer tube 41 and an inner shaft 42, and the outer tube 41 has a yoke 4b-1 which is welded to an end portion and forms the universal joint 4b and the inner shaft 42 has a yoke 4a-1 which is welded to an end portion and forms the universal joint 4a. A female spline 43 is formed on the inner peripheral surface of the outer tube 41, meanwhile, a male spline 45 fitted to the female spline 43 is formed on the outer peripheral surface of the tip end 44 of the inner shaft 42. Additionally, at least one surface of the female spline 43 and the male spline 45 is coated by the low-friction resin such as PTFE (polytetrafluoroethylene), polyamide resin.

Figure 15:
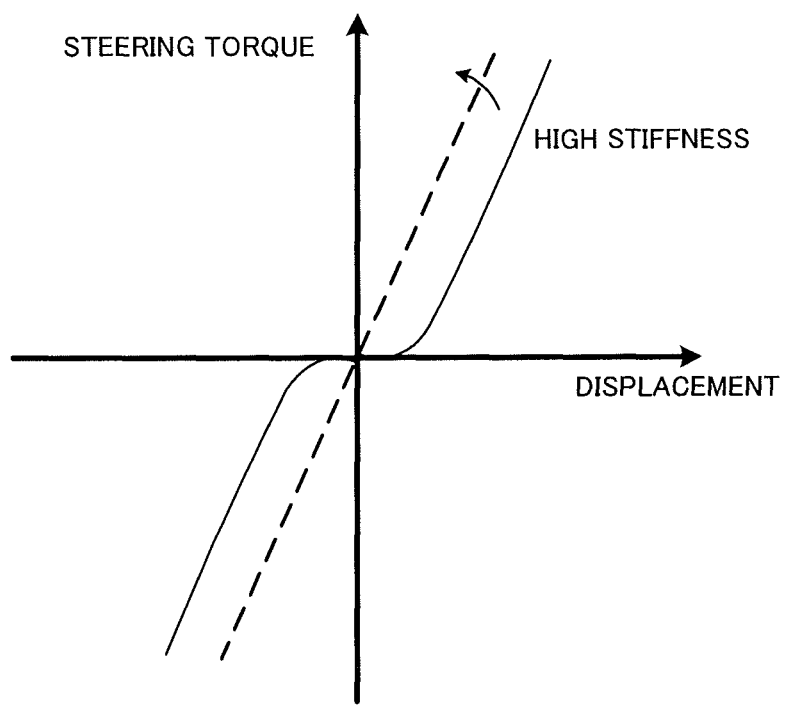
FIG. 15 is a diagram showing the characteristic example of a steering mechanism comprising an intermediate shaft.

Generally, in the steering mechanism comprising the intermediate shaft 4, there is a dead zone as shown in FIG. 15 by the solid line, thereby the steering feeling is deteriorated. So the intermediate shaft with high stiffness is required in order to improve the steering feeling, and it is necessary to choose a characteristic without the dead zone (or a small dead zone) as shown by the dashed line in FIG. 15. If the stiffness of the intermediate shaft 4 is high, transmitting the friction of steering mechanism will become easy, so it will become sensitive about the friction feeling. The dead zone is mainly generated in the universal joints 4a and 4b of the ends of the intermediate shaft, and in the fit section of the outer tube 41 and the inner shaft 42.

The universal joints 4a and 4b as shown in Japanese Patent Application Laid-Open No. 2003-97592 for instance, is comprised by a cross-shaped joint in which a spider shaft portion is rotatably fitted to a bearing hole of the yoke via a needle bearing, and the needle bearing and the spider shaft portion are interference fitted. Thus, it is possible to reduce the dead zone generated at the universal joints 4a and 4b by strengthening the interference fit between the needle bearing and the spider shaft portion. Moreover, the dead zone generated in the fit section of the outer tube 41 and the inner shaft 42 can be reduced by minimizing the dimensional difference between the outer tube 41 and the inner shaft 42, or by coating a polyamide resin or PTFE on the surface of the outer tube 41 and/or the inner shaft 42.

Furthermore, when the outer tube 41 and the inner shaft 42 are interference fitted, the resin is softened and is adapted to the outer tube 41 by heating them in fitted condition, so it is possible to achieve a good balance between expanding-contracting lightly and reducing the dead zone. In addition, it is good to choose an intermediate shaft utilizing balls or springs instead of the resin coat as long as it is possible to reduce the dead zone.

The effect of the friction compensation can be enhanced by eliminating or reducing the above dead zone generated in the intermediate shaft 4.

Although embodiments of the present invention have been described specifically, the present invention is not limited thereto, and appropriate alterations may be made without departing from the concept thereof.

EXPLANATION OF REFERENCE NUMERALS

20 motor
21 motor current detection means
22 rotation sensor
23 motor angular speed calculating section
24 motor angular acceleration calculating section
101 current command value calculating section
102 phase compensator
104 maximum current limiter
106 PI-controller
107 PWM-controller
108 inverter
110 torque compensator
111 SAT estimating section
112 differential compensator
113 convergence controller
114 inertia compensator
120, 120A, 120B, 120C friction compensator
121 friction compensation value calculating section
122-125 multiplier
130, 130A, 130B, 130C gain calculating section
131 velocity-sensitive gain calculating section
132 motor angular speed-sensitive gain calculating section
133 current control value-sensitive gain calculating section
134 steering torque-sensitive gain calculating section

The invention claimed is:

1. An electric power steering apparatus comprising:
a steering mechanism;
a motor for providing a steering force to said steering mechanism; and
a friction compensator, wherein:
a current command value is calculated based on at least a steering torque, and the motor is controlled by a current control value calculated based on said current command value to provide a steering assist force to said steering mechanism,
the friction compensator calculates, in advance, a friction compensation value for compensating a friction to said steering mechanism on a basis of said steering torque,
said friction compensator sets a steering torque target value range which has a predetermined range having an upper target limit and an lower target limit based on said steering torque, and is configured to calculate said friction compensation value in accordance with a difference between said steering torque and an intermediate value measured within the upper target limit and the lower target limit of said steering torque target value range,
said steering torque target value range is composed of a first range and a second range, said first range has an equal width to said intermediate value aid and is set within a range that said friction compensation value does not vary, said second range has a larger width than said first range to said intermediate value and is set within a range without any uncomfortable steering feeling, and said intermediate value is included within said first range and said first range is included within said second range,
said friction compensator sets said friction compensation value to be zero when said steering torque is within said first range, calculates said friction compensation value in accordance with a difference between said steering torque and said intermediate value of said steering torque target value range when said steering torque is outside said first range but within said second range, updates said intermediate value for a lead side and sets said steering torque target value range again when said steering torque is outside said first range and said second range so that said steering torque becomes within said steering torque target value range, and said current command value is corrected by said friction compensation value, and wherein an operation that said first range and said second range and said second range are newly set to an updated steering torque target value range, is repeated.

2. An electric power steering apparatus according to claim 1, wherein said friction compensator comprises a friction compensation value calculating section calculating a friction compensation calculating value in accordance with said steering torque, and a gain calculating section calculating at least one gain by which said friction compensation calculating value is multiplied, calculates said friction compensation value by multiplying said friction compensation calculating value by said at least one gain.

3. An electric power steering apparatus according to claim 2, wherein said gain calculating section includes a velocity-sensitive gain calculating section calculating a velocity-sensitive gain which is determined in accordance with a velocity, and said velocity-sensitive gain is one of the at least one gain.

4. An electric power steering apparatus according to claim 3, wherein said velocity-sensitive gain is set in accordance with a value of said velocity.

5. An electric power steering apparatus according to claim 2, wherein said gain calculating section includes a motor angular speed-sensitive gain calculating section calculating a motor angular speed-sensitive gain which is determined in accordance with a motor angular speed, and said motor angular speed-sensitive gain is one of the at least one gain.

6. An electric power steering apparatus according to claim 4, wherein said gain calculating section includes a motor angular speed-sensitive gain calculating section calculating a motor angular speed-sensitive gain which is determined in accordance with a motor angular speed, and said motor angular speed-sensitive gain is one the at least one gain.

7. An electric power steering apparatus according to claim 5, wherein said motor angular speed-sensitive gain is set in accordance with a value and a direction of said motor angular speed.

8. An electric power steering apparatus according to claim 2, wherein said gain calculating section comprises a current control value-sensitive gain calculating section calculating a current control value-sensitive gain which is determined in accordance with said current control value, and said current control value-sensitive gain is one the at least one gain.

9. An electric power steering apparatus according to claim 8, wherein said current control value-sensitive gain is set in accordance with a value and a direction of said current control value.

10. An electric power steering apparatus according to claim 2, wherein said gain calculating section includes a steering torque-sensitive gain calculating section calculating a steering torque-sensitive gain which is determined in accordance with said steering torque, and said steering torque-sensitive gain is one of said gains.

11. An electric power steering apparatus according to claim 10, wherein said steering torque-sensitive gain is set in accordance with a value and a direction of said steering torque.

12. An electric power steering apparatus according to claim 8, wherein said gain calculating section includes a steering torque-sensitive gain calculating section calculating a steering torque-sensitive gain which is determined in accordance with said steering torque, and said steering torque-sensitive gain is one of said gains.

13. An electric power steering apparatus according to claim 12, wherein said steering torque-sensitive gain is set in accordance with a value and a direction of said steering torque.

* * * * *